United States Patent [19]

Day

[11] Patent Number: 5,359,828
[45] Date of Patent: Nov. 1, 1994

[54] POST ASSEMBLY

[76] Inventor: John E. Day, 24 Rose Hill Ter., Yonkers, N.Y. 10703

[21] Appl. No.: 129,326

[22] Filed: Sep. 30, 1993

[51] Int. Cl.$^5$ .............................................. E09C 5/04
[52] U.S. Cl. ...................................... 52/665; 52/668; 403/247
[58] Field of Search ................ 52/731.3, 732.2, 653.1, 52/656.9, 664, 665, 667, 668; 403/230, 247, 347

[56]           References Cited
         U.S. PATENT DOCUMENTS

| 2,562,483 | 7/1951 | Bender | 403/247 |
| 3,749,432 | 7/1973 | Sanssen | 52/665 X |
| 4,274,756 | 6/1981 | Lange | 403/347 |
| 4,449,066 | 12/1984 | Hanlon | 52/665 X |

*Primary Examiner*—Carl D. Friedman
*Assistant Examiner*—Creighton Smith
*Attorney, Agent, or Firm*—Martin J. Spellman, Jr.

[57]              ABSTRACT

A wood post assembly for supporting signs or mail boxes is constructed entirely of wood parts without metal fasteners and without adhesives. It includes a post, cross beam and beam support member. A mortise runs through the post and the cross beam has a tenon extending through the post mortise. A first dowel pin extends through an aperture in the tenon and bears against the rear of the post. The support beam lies against the front face of the post with its upper end supporting the cross beam. A second dowel pin extends through axially aligned apertures drilled through the support member and post. The top surface of the support member has an inclined plane matching that of a recess formed in the lower surface of the cross beam.

2 Claims, 1 Drawing Sheet

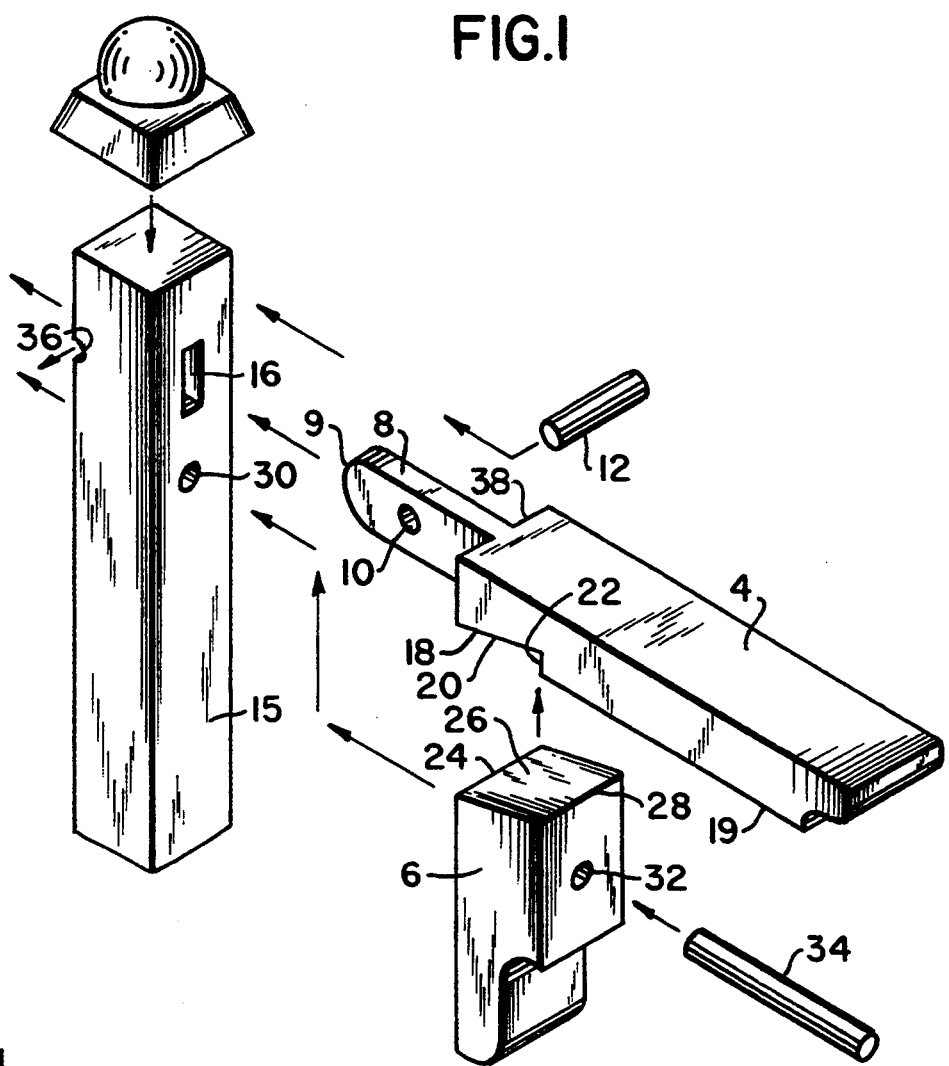
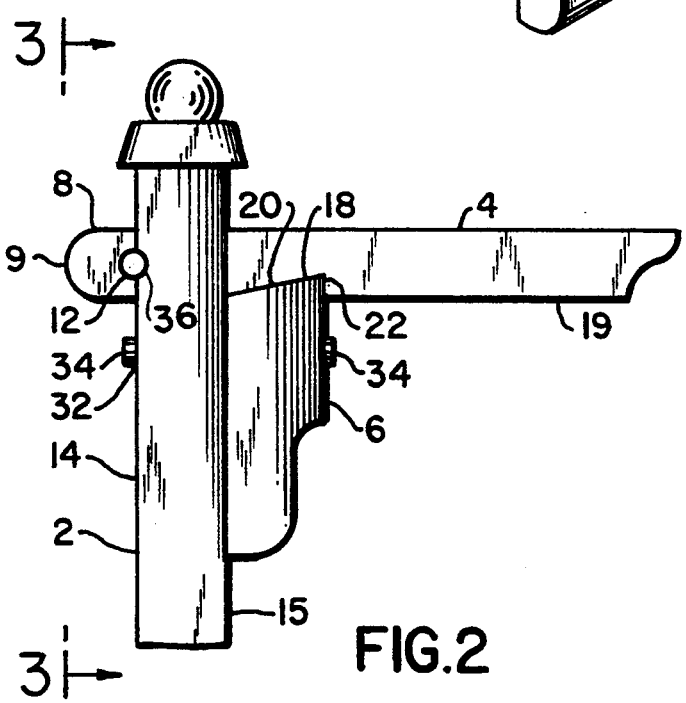
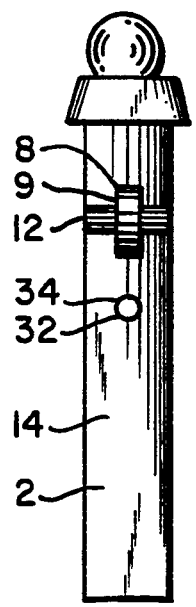
FIG.1
FIG.2
FIG.3

POST ASSEMBLY

BACKGROUND OF THE INVENTION

1. Field of the Invention

The present invention is concerned with a post and beam assembly such as is utilized for hanging signs and supporting mail boxes. The present invention provides a sturdy post and beam assembly requiring no nails, screws or other mechanical fastening devices or adhesives to hold it together. It is exceptionally sturdy and attractive.

2. Prior Art

Representative of the conventional post and beam assemblies presently available are disclosures in the following U.S. Pat. No. 1,358,322, Mcintosh for a mail box bracket, U.S. Pat. No. 4,213560, Hall for an adjustable mail box standard, U.S. Pat. No. 4,951,904, Obenshain for a stake supported mail box post and U.S. Pat. No. 5,076,032, Lehman which is most concerned with an anchoring device for the post.

SUMMARY OF THE INVENTION

The present invention provides a sturdy and extremely attractive wooden post assembly for use in supporting signs or mail boxes and other similar uses. The assembly is constructed entirely of wooden parts without the use of any fasteners such as nails or screws and without adhesives.

The assembly includes an upright post having front and rear faces and a mortise formed therein from front to rear at the appropriate height for securing a beam thereto. The cross beam includes a dorsal and an proximal end. The proximal end is formed with longitudinally extending tenon at the proximal end corresponding in cross-sectional shape to the mortise formed in the upright post. A transverse aperture is formed in the tenon and extends a distance somewhat greater than the thickness of an upright post from the cross-beam, main portion. The underside of the beam has an undercut with an inclined slope from the lower surface adjacent to the upright post to a downwardly extending vertical wall. The distance between the inner edge of the beam and the downwardly extending wall is exactly the same dimensional thickness of the support member described below. The support piece is perpendicularly aligned with the post and has approximately the same cross-sectional dimensions thereof. The upper edge has an inclined plane corresponding to the notched out section of the cross beam described above. The rear face of the post has a recessed formed therein distant from the top and bottom of the tenon and of the same diameter as the aperture formed in the tenon which corresponds with the diameter of the dowel piece. The cross beam is placed against the upright and the tenon extends through the mortise and a first dowel driven transversely through the transverse aperture and in the tenon and bears against the rear of the post and the recess.

The support member is pressed upwardly against the inclined face of the lower surface of the cross beam and, while being held in that position, an aperture is drilled from the front face to the rear of the support member, centrally located in faces thereof, and through the front and rear faces of the upright post. The second dowel is then driven through these apertures hugging the support piece in place against the front face of the upright post and the lower bevelled out section of the lower face of a cross beam.

The structure provides a extremely, sturdy structure locking the post and cross beam together without the use of any mechanical fastening means except for the wooden structure pieces. No fasteners are utilized. Their attractive, finished appearances are obtained with unusual strength and rustic appearance.

BRIEF DESCRIPTION OF THE DRAWING

In the accompanying drawing which forms a part of this specification:

FIG. 1 is an exploded perspective view of the post assembly of the present invention;

FIG. 2 is a side plan view of the completed assembly;

FIG. 3 is a rear plan view taken along lines 3—3 of FIG. 2 of the completed assembly.

ILLUSTRATIVE SPECIFIC EMBODIMENT

In the illustrative embodiment, the apparatus comprises a assembly wherein all the parts are comprised of wood and wherein no nails, screws or other mechanical fastening devices are utilized. While it may be desirable by some users to use adhesive on the assembled parts, it is not necessary.

The assembly includes a 4"×4" post 2, hanging beam 4, and support member 6. Hanging beam 4 at its inner wall has a longitudinally extending tenon 8 terminating in the curved decorative end 9. A transverse circular aperture 10 is drilled crossways in the tenon 8 at a distance slightly less than the thickness of the post 2 from the edge 22 of the support beam member 6. At the height on the upright post 2 wherein it is desired to mount the hanging beam 4, an aperture 16 or mortise is cut transversely through the post 2, matching the cross-section of tenon 8.

On the rear side 14 of the post 2, a transverse depression 36 is provided crossways in the center of the mortise 16, the diameter corresponding to the diameter of the transverse opening 10 in the tenon 8 in order to receive the first dowel pin 12.

The beam 4 has a recess 18 formed in it on the lower surface 19 at a point adjacent to front side 15 of post 2, close to and extending outwardly and upwardly along an inclined plane 20 a distance corresponding to the thickness of the support member 6, terminating in a vertically, downwardly extending wall 22 as shown most clearly in FIG. 2.

The top surface 24 of the support member 6 as shown in FIG. 1 has a corresponding inclined plane 26 sloping upwardly from the near wall of the support member 6 to the top outer edge 28 shown in FIG. 1. The slope of the inclined surface 26 corresponds to the slope 20 of the undercut or recess 18 of the cross beam 4. The cross beam 4 tenon 8 is placed in the mortise 16 and the first dowel 12 driven through the aperture 10 and along the depression 36 to secure the beam 4 to the post 2. The support member 6 is then placed against the front side 15 of the post 2 and compressed upwardly so that the inclined plane 26 surface of the support piece 6 and the inclined surface 20 of the hanging beam 4 are tightly pressed against each other. The support member 6 is clamped upwardly or held in place with an upward force and then an aperture 32 is drilled through the support piece 6. Simultaneously, the aperture 30, in line with the aperture 32, is drilled through the post 2 while the support member 6 is held tightly in place against a hanging beam 4. With the parts clamped tightly, the second dowel 34 is driven through the apertures 32 and 30, tightly securing the support member 6 in place under the hanging beam 4 and is in turn locked in place by the undercut 18 and the dowel 34.

The resulting assembly is extremely rigid, and no adhesive, nails, screws or other fastener are used to hold it together. It presents a very attractive finished product that is very sturdy.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A post assembly comprising an upright post, a cross beam having an inclined plane formed in a recess in a lower surface of said crossbeam, beam support member having an upper end with a top surface and a lower end, and two locking dowel pins, said upright post having a front face and a back face with a mortise running through said post between said front and rear faces, said cross beam having a dorsal end and a proximal end, and a longitudinal tenon extending from said proximal end and through said mortise in said upright post, a first of said dowel pins running through a transverse aperture in said tenon and extending on both ends thereof and bearing firmly against the rear surface of said upright post, said beam support member lying against the front face of said upright post with the upper end of said support member supporting said cross beam, a second dowel pin extending through axially aligned apertures drilled in said support member and said upright post, said top surface of said support member having an inclined plane matching said inclined plane of said recess formed in the lower surface of said cross beam.

2. A post having front and rear faces assembly comprising an upright post, cross beam, having an inclined plane formed in a recess in a lower surface thereof, and beam support member having an upper end with a top surface and a lower end, and an aperture extending therethrough said upright post having a front face with a mortise running through said post between said front and rear faces and an aperture extending from the front to rear faces, said cross beam having a longitudinal tenon extending through said mortise in said upright post, a first dowel pin running through a transverse aperture in said tenon and extending on both ends thereof and bearing firmly against a recess in the rear surface of said upright post, said beam support member lying against the front face of said upright post with the upper end of said support member supporting said cross beam, a second dowel pin extending through axially said cross beam, a second dowel pin extending through axially aligned apertures formed in said support member and said upright post, said top surface of said support member having an inclined plane matching said inclined plane of said recess formed in the lower surface of said cross beam.

* * * * *